Figure 1:
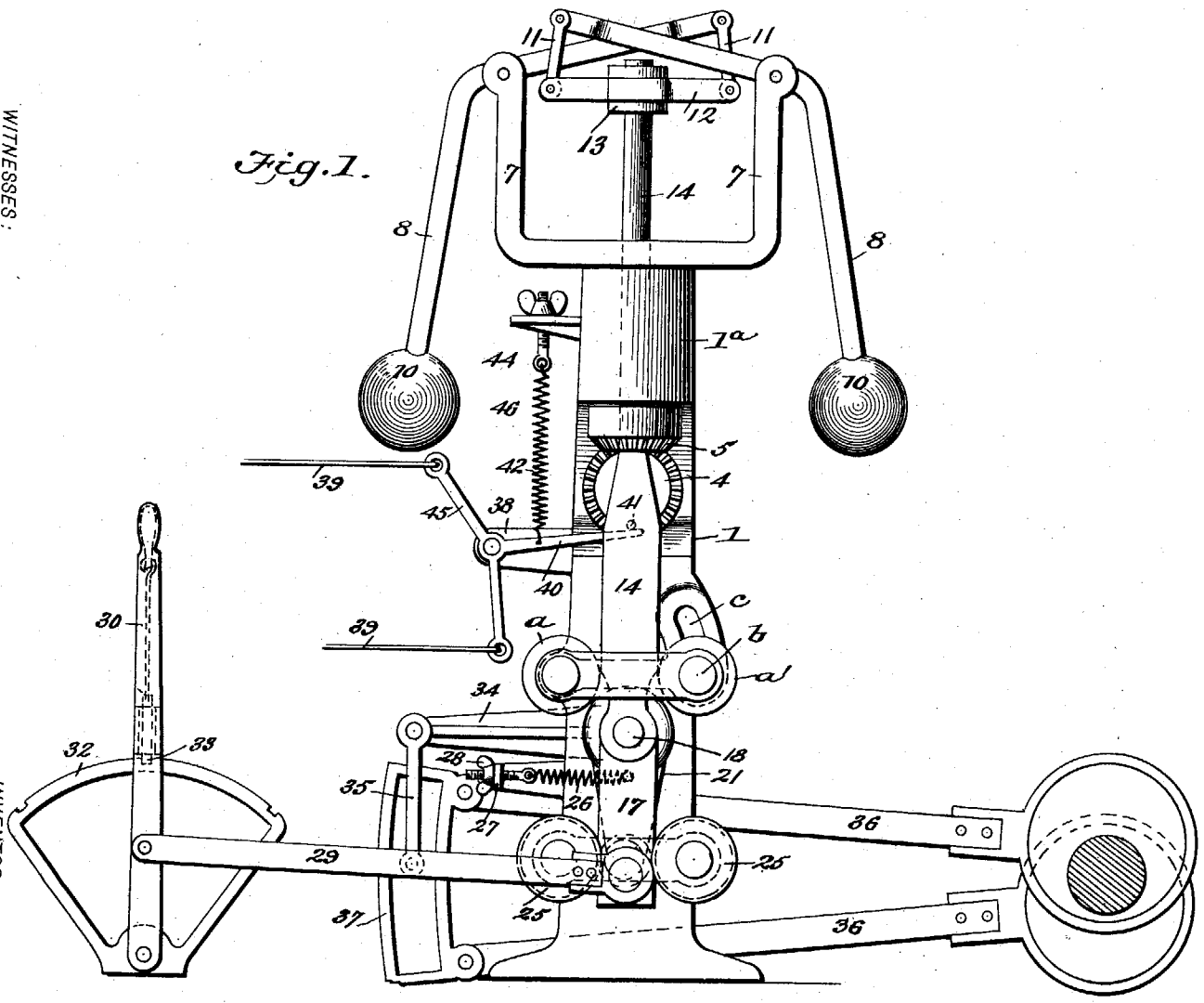

No. 11,711. Reissued Jan. 24, 1899.

M. O. ARNEGAARD.

VARIABLE GOVERNOR CUT-OFF FOR ENGINES.

(Application filed Nov. 29, 1898.)

4 Sheets—Sheet 1.

WITNESSES:

W. S. Blondel

Amos N. Hart

INVENTOR

M. O. Arnegaard.

BY Munn & Co.

ATTORNEYS.

THE NORRIS PETERS CO., PHOTO-LITHO., WASHINGTON, D. C.

No. 11,711. Reissued Jan. 24, 1899.

M. O. ARNEGAARD.

VARIABLE GOVERNOR CUT-OFF FOR ENGINES.

(Application filed Nov. 29, 1898.)

4 Sheets—Sheet 2.

WITNESSES:

W. D. Rowell

Amos W. Hart

INVENTOR

M. O. Arnegaard.

BY Munn & Co.

ATTORNEYS.

THE NORRIS PETERS CO., PHOTO-LITHO., WASHINGTON, D. C.

No. 11,711. Reissued Jan. 24, 1899.

M. O. ARNEGAARD.

VARIABLE GOVERNOR CUT-OFF FOR ENGINES.

(Application filed Nov. 29, 1898.)

4 Sheets—Sheet 3.

WITNESSES:
M. D. Blondel
Amos W. Hart

INVENTOR
M. O. Arnegaard.
BY Munn & Co.
ATTORNEYS.

THE NORRIS PETERS CO., PHOTO-LITHO., WASHINGTON, D. C.

No. 11,711. Reissued Jan. 24, 1899.
M. O. ARNEGAARD.
VARIABLE GOVERNOR CUT-OFF FOR ENGINES.
(Application filed Nov. 29, 1898.)
4 Sheets—Sheet 4.
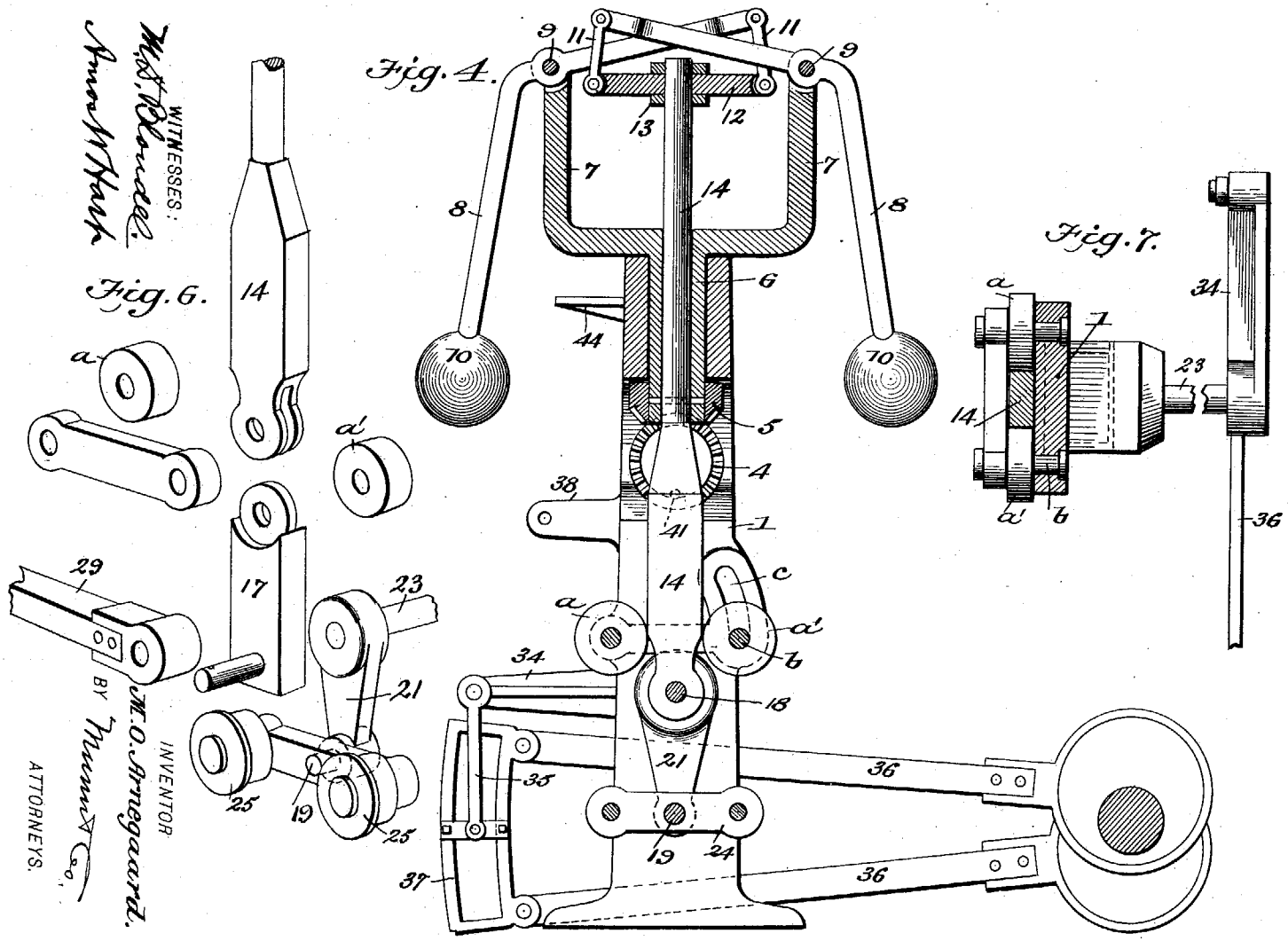
WITNESSES:
M. S. Blondell.
Amos W. Hart
INVENTOR
M. O. Arnegaard.
BY Munn & Co.
ATTORNEYS.
THE NORRIS PETERS CO., PHOTO-LITHO., WASHINGTON, D. C.

UNITED STATES PATENT OFFICE.

MARTIN O. ARNEGAARD, OF HILLSBOROUGH, NORTH DAKOTA.

VARIABLE GOVERNOR CUT-OFF FOR ENGINES.

SPECIFICATION forming part of Reissued Letters Patent No. 11,711, dated January 24, 1899.

Original No. 596,565, dated January 4, 1898. Application for reissue filed November 29, 1898. Serial No. 697,809.

*To all whom it may concern:*

Be it known that I, MARTIN O. ARNEGAARD, a citizen of the United States, residing at Hillsborough, in the county of Traill and State of North Dakota, have invented certain new and useful Improvements in Automatic Variable Governor Cut-Offs for Steam-Engines; and I do declare the following to be a full, clear, and exact description of the invention, such as will enable others skilled in the art to which it appertains to make and use the same.

My invention has relation to automatic governor cut-offs for steam-engines; and the object is to provide a simple, effective, and reliable governor for adjustable cut-off reversing valve-gears; and to this end the novelty consists in the construction, combination, and arrangement of the same, as will be hereinafter more fully described, and particularly pointed out in the claims.

In the accompanying drawings the same reference characters indicate the same parts of the invention.

Figure 3:
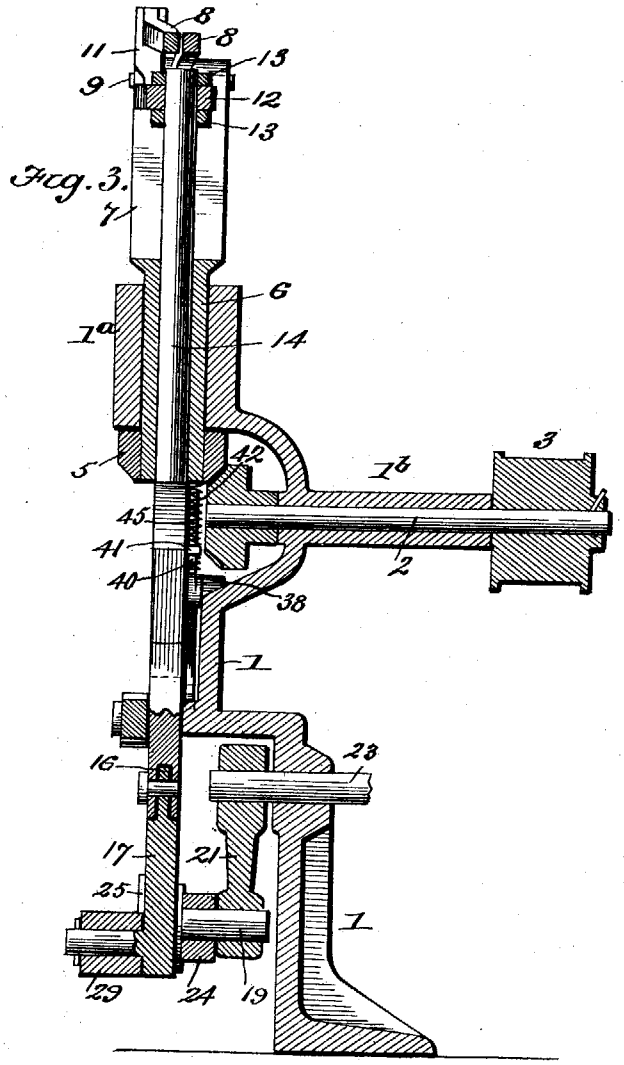
Figure 2:
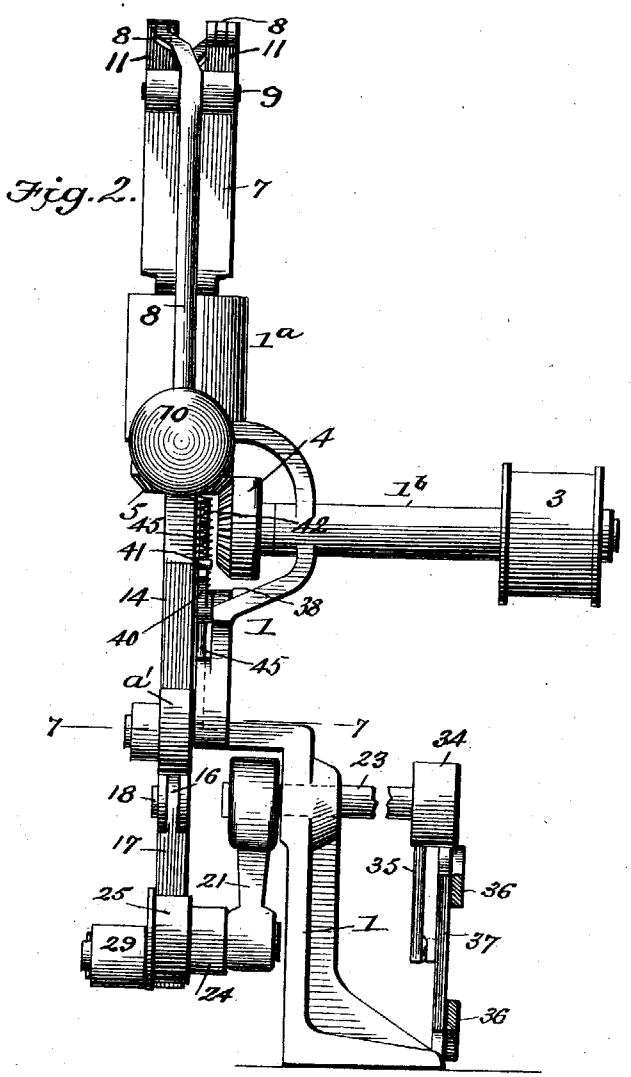
Figure 5:
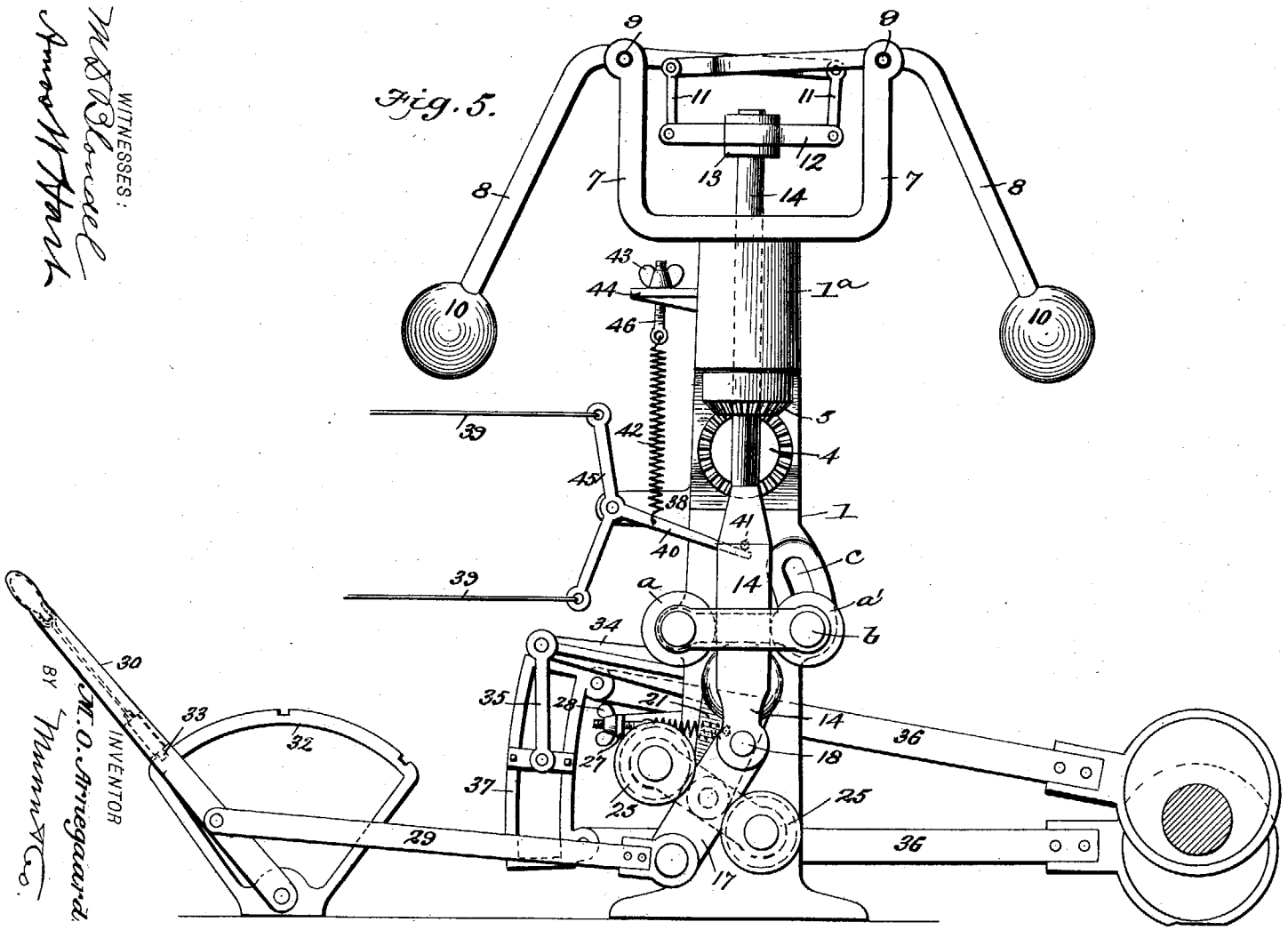

Figure 1 is a side elevation of my improved automatic cut-off governor. Fig. 2 is an end view of the same. Fig. 3 is a vertical section. Fig. 4 is a similar view taken at a right angle to that shown in Fig. 3. Fig. 5 is a side elevation showing the governor in operative position. Fig. 6 is a perspective view of parts of the governor detached from each other. Fig. 7 is a section on line 7 7 of Fig. 2.

The governor is shown in connection with a link-reversing valve-gear.

The working parts of the governor are supported upon and properly attached to a vertical standard 1. The latter has a tubular upper portion $1^a$ (see Figs. 2 and 3) and a horizontal tubular portion $1^b$. The part $1^a$ serves as a bearing for the sleeve 6, which guides the vertically-slidable rod or shaft 14, and the lateral part $1^b$ serves as a bearing for a rotary shaft 2, carrying a pulley 3. A belt (not shown) runs on the latter for driving the governor in the usual way. On the inner end of said shaft 2 is keyed a bevel-gear 4, that meshes with another, 5, fixed on the lower end of a sleeve 6, which is journaled and free to rotate in the tubular part $1^a$ of standard 1. The head of said sleeve 6 is provided with bent arms 7, (see Figs. 1 and 4,) and in the upper ends of the latter are pivoted by bolts 9 the bent governor-arms 8, carrying balls 10. The inner ends of said arms 8 are pivoted to the upper ends of the connecting-rods 11, the lower ends of which are pivoted to the horizontal cross-head 12, which is loosely held between collars 13 on vertical shaft 14. It is apparent that when the sleeve 6 is rotated through the medium of horizontal shaft 2 the weighted lever-arms 8 will be revolved and their weighted ends will rise and fall by centrifugal action, whereby the shaft 14 will slide up or down correspondingly and shift the link that controls the slide-valve.

The flat lower portion of the shaft 14 is arranged to slide between opposite guide-rollers $a$ and $a'$, which relieve binding or friction of the same in sleeve 6. The roller $a$ is mounted rotatably on a fixed journal, while the other roller $a'$ is on a journal $b$, having a reduced end adapted to enter the arc slot $c$ and threaded to receive a nut. The latter and the shoulder of the journal $b$ thus formed abut opposite sides of the slotted part, and by adjusting the nut the journal may be clamped to hold it fixed wherever placed.

The lower end of the shaft 14 is pivoted by pin 18 to a bar 17. (See Figs. 2 and 5.) Said bar is practically a pivoted extension of shaft 14. A rod 29, Figs. 1 and 5, pivotally connects said bar 17 with a hand-lever 30, having a locking spring-pawl 33, that engages a segmental rack 32, fixed contiguous to the governor proper. Through the medium of said lever 30 the bar 17 may be shifted from the vertical position shown in Fig. 1 to a lateral inclination right or left, as illustrated in Fig. 5, and thereby the position of the slotted link 37 may be shifted up or down, as required to adjust the usual slide-valve, (not shown,) and thereby control the engine as required. The link 37 is connected with eccentrics on the engine-shaft by means of rods 36 in the usual way. The means of connection between the bar 17 and the slotted link 37 will now be described.

As shown best in Figs. 2 and 3, a horizontal rock-shaft 23 is journaled at one end in standard 1 and has two fixed cranks 21 and 34. The former, 21, is normally pendent and the other horizontal, as shown. The crank 34 is connected by rod 35 (see Fig. 5) with a yoke on slotted link 37, so that if the shaft 23 be rotated a part of a revolution the link 37 will be raised or lowered, and the slide-valve (not shown) thereby shifted accordingly. The shaft 23 is rocked for this purpose through the means of connection between its crank 21 and the aforesaid bar 17, which is directly in front of the crank. Said means are a short bar 24, pivoted on pin 19, fixed in lower end of said crank, and two flanged rollers 25, which are journaled on the ends of said bar 24. Thus the bar 17 slides between rollers 25, and the latter also serve as points of leverage for the same when thrown laterally or into oblique position, as shown in Fig. 5, for it is obvious that in such case the bar 17 presses laterally on a roller 25, and thus shifts the crank 21 laterally to a corresponding degree, and this in turn rocks shaft 23, which adjusts the slotted link 37, as before stated. It is apparent that as the shaft 14 rises or falls by centrifugal action of the governor-arms 8 the bar 17 will also move vertically and shift the crank 21 laterally more or less, and thereby shift the link 37 correspondingly. Thus a very sensitive and efficient automatic cut-off reversing valve-gear is produced.

In connection with the governor proper I employ a spring-counterbalance for the link and connected parts, the same consisting of a spiral spring 26 and means for adjusting its tension. Said spring (see Fig. 1) is attached to crank 21 of shaft 23 and to an adjusting-screw 29, that passes through a lateral lug 27 on standard 1 and has a thumb-nut 28 applied, as shown.

The governor-shaft 14 may be shifted manually to control the speed of the engine by means of a T-shaped lever, Fig. 1, and pull rods or cords 39. Said lever is pivoted to a lug 38 on standard 1, and its arm 40 engages a lateral pin 41 of shaft 14.

To aid in counterbalancing the shaft 14 and bar 17 and resist the centrifugal action of the governor-balls, a spiral spring 42 is attached vertically to the lever-arm 40 and to a screw 46, that passes through a lug or bracket 44 and has a thumb-nut 43 for adjusting it higher or lower, as required.

Although I have specifically described the construction and relative arrangement of the several elements of the invention, I do not desire to be confined to the same, as such changes or modifications may be made as clearly fall within the scope of my invention without departing from the spirit thereof.

The attachment of the governor to other adjustable cut-off reversing valve-gears is practically the same as the attachment to the link valve-gear. In each case the rock-shaft 23 is in operative connection with the valve-gear, so that the speed of the engine is controlled. When the governor is used with other valve-gears, the spring 26 is not necessary; nor would it be required on vertical engines with the link reverse-gear, since then the weight of the link would rest on the eccentric-rods.

Having thus described my invention, what I claim is—

1. An automatic variable governor cut-off for steam-engines, comprising the standard 1, the sleeve 6, vertically journaled therein, the governor-levers 8, 8, fulcrumed in the upper end thereof, the vertical shaft 14, journaled in said sleeve and in operative connection with said levers, the connecting-bar 17 pivoted to the lower end of said shaft 14 in combination with the rock-shaft 23, the crank 21 fixed thereon, the bar 24 carried by the crank, and having guide-rollers, and means substantially as described for operatively connecting the aforesaid rock-shaft with the valve-gear and governing the latter, as set forth.

2. An automatic variable governor cut-off for steam-engines, comprising the standard 1, the sleeve 6, journaled therein and means substantially as described for imparting motion to said sleeve, the governor-levers 8, 8, carried by said sleeve, the shaft 14 journaled in said sleeve, and in operative connection with said levers, in combination with the shaft 23, its crank 21, the arm 24, fixed thereon, the rollers 25, 25, mounted thereon, the connecting-bar 17, pivoted to the lower end of the shaft 14, the arm 34 fixed on said shaft 23 and in operative connection with the valve-gear, substantially as and for the purpose set forth.

3. An automatic variable cut-off governor for steam-engines, comprising the standard 1, the vertical sleeve 6 journaled therein and terminating at its upper end in the vertical parallel arms 7, 7, the governor-levers 8, 8, fulcrumed in the upper ends of said arms, the vertical cylindrical shaft 14 journaled in said sleeve 6, the horizontal cross-head 12, pivoted on the upper end of said shaft, and the rods 11, 11, connecting the outer ends of said cross-head to the inner ends of the levers 8, 8, in combination with the bar 17 pivoted at its upper end to the lower end of the shaft 14, the rock-shaft 23 provided with the crank 21, the bolt connecting said bar 17 and rod 29, and the horizontal arm 34 fixed on said rock-shaft and in operative connection with the link 37, and means substantially as described for imparting motion to said link independently of the movement communicated to it by the governor-levers 8, 8, as and for the purpose set forth.

4. In an automatic cut-off governor for steam-engines, the combination of governor proper, including a vertically-slidable shaft, a bar 17, which is pivoted to the lower end of said shaft, and means for manually adjusting the angle of said bar to the shaft, with a rock-shaft having a crank 21, carrying a guide for such pivoted bar, and means for operatively connecting said rock-shaft with the valve-gear, substantially as shown and described.

MARTIN O. ARNEGAARD.

Witnesses:

OLE ARNEGARD,

P. G. SWENSON.